United States Patent
Ueki et al.

(10) Patent No.: US 9,591,487 B2
(45) Date of Patent: Mar. 7, 2017

(54) MOBILE STATION, NETWORKING APPARATUS, AND MOBILE COMMUNICATION METHOD

(71) Applicant: NTT DOCOMO, INC., Tokyo (JP)

(72) Inventors: Atsushi Ueki, Tokyo (JP); Takehiro Ida, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 33 days.

(21) Appl. No.: 14/419,173

(22) PCT Filed: Jul. 29, 2013

(86) PCT No.: PCT/JP2013/070488
§ 371 (c)(1),
(2) Date: Feb. 2, 2015

(87) PCT Pub. No.: WO2014/021266
PCT Pub. Date: Feb. 6, 2014

(65) Prior Publication Data
US 2015/0230092 A1    Aug. 13, 2015

(30) Foreign Application Priority Data
Aug. 3, 2012 (JP) .................................. 2012-173047

(51) Int. Cl.
*H04W 12/08* (2009.01)
*H04W 76/02* (2009.01)
(Continued)

(52) U.S. Cl.
CPC ........... *H04W 12/08* (2013.01); *H04W 48/02* (2013.01); *H04W 76/02* (2013.01); *H04W 48/16* (2013.01)

(58) Field of Classification Search
CPC ..... H04W 12/08; H04W 48/02; H04W 76/02; H04W 48/16
See application file for complete search history.

(56) References Cited

U.S. PATENT DOCUMENTS

2009/0116385 A1   5/2009  Ueda
2009/0253430 A1*  10/2009  Asanuma .............. H04W 88/12
                                          455/434

FOREIGN PATENT DOCUMENTS

JP       2011 82716        4/2011
WO       2007 111009       10/2007
WO    WO 2011/043323 A1    4/2011

OTHER PUBLICATIONS

NTT DOCOMO, Inc., "The necessity of access control for IMS voice/video from UE in RRC Connected mode", 3GPP TSG-RAN WG2 Meeting #79, R2-123674, (Aug. 13-17, 2012), 5 pages.
(Continued)

*Primary Examiner* — Chuong A Ngo
(74) *Attorney, Agent, or Firm* — Oblon, McClelland, Maier & Neustadt, L.L.P.

(57) ABSTRACT

A mobile station, a networking apparatus, and a mobile communication method with which access restriction according to SSAC can be achieved with greater reliability even when the mobile station is in an RRC CONNECTED state. A UE 100 acquires restriction information indicating a content of Service Specific Access Control, and cancels transmission of a call-origination request based on the acquired restriction information if the call-origination request is generated when the UE 100 is in an RRC CONNECTED state in which connection to an access network is established on a radio resource control layer, the transmission being cancelled in the RRC CONNECTED state.

6 Claims, 6 Drawing Sheets

(51) Int. Cl.
H04W 48/02 (2009.01)
H04W 48/16 (2009.01)

(56) References Cited

OTHER PUBLICATIONS

NTT DOCOMO, Inc., "The necessity of access control in RRC_Connected", 3GPP TSG-RAN2 Meeting #79, R2-123712, (Aug. 13-17, 2012), 4 pages.

3GPP TS 36.331 V11.0.0 Technical Specification, "3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP, (Jun. 2012), 302 pages.

3GPP TS 24.173 V11.2.0 Technical Specification, "3$^{rd}$ Generation Partnership Project; Technical Specification Group Core Network and Terminals; IMS multimedia telephony communication service and supplementary services; Stage 3 (Release 11)", 3GPP, (Mar. 2012), 17 pages.

3GPP TR 22.986 V9.0.0 Technical Report, "3$^{rd}$ Generation Partnership Project; Technical Specification Group Services and System Aspects; Study on Service Specific Access Control (Release 9)", 3GPP, (Dec. 2008), 8 pages.

3GPP TS 22.011 V10.0.0 Technical Specification, "3$^{rd}$ Generation Partnership Project; Technical Specification Group Services and System Aspects; Service accessibility (Release 10)", 3GPP, (Jun. 2010), 25 pages.

International Search Report Issued Oct. 8, 2013 in PCT/JP13/070488 Filed Jul. 29, 2013.

Extended Search Report issued Mar. 24, 2016 in European Patent Application No. 13826226.6.

3GPP TR 23.898 V 2.0.0 . 3rd Generation Partnership Project; Technical Specification Group Services and System Aspects; Access Class Barring and Overload Protection; (Release 6), 3$^{RD}$ Generation Partnership Project (3GPP), Global System for Mobile communications, vol. CN WG1, Feb. 21, 2005, XP050402727, 9 pages.

Japanese Office Action issued Sep. 20, 2016 in counterpart Japanese Patent Application 2012-173047 (with English Translation).

Report of 3GPP TSR RAN WG2 meeting #67bis (R2-097514), held in Miyazaki, Japan, Oct. 12-16, 2009, TSG-RAN Working Group 2 meeting #68 Jeju, Korea, Nov. 9 13, 2009, 160 pages.

\* cited by examiner

MOBILE STATION, NETWORKING APPARATUS, AND MOBILE COMMUNICATION METHOD

TECHNICAL FIELD

The present invention relates to a mobile station, a networking apparatus, and a mobile communication method that restrict transmission, to an access network, of a call-origination request for provision of a predetermined communication service, such as voice or video communication, specified by service-specific access control.

BACKGROUND ART

In Long Term Evolution (LTE) defined in 3rd Generation Partnership Project (3GPP), as one of access restriction mechanisms for restricting access from a User Equipment (UE) to an access network (IP-CAN), Service Specific Access Control (SSAC) restricting a specific communication service (e.g., voice communication or video communication) is defined (for example, Non-patent documents 1 and 2). Specifically, in activating a function of IMS Voice (MMTEL-Voice) or IMS Video (MMTEL-Video) both involving IP multimedia subsystem (IMS), a UE determines whether access to the IP-CAN is allowed or not based on broadcast information (System Information Block (SIB)) broadcasted from the IP-CAN, and determines whether or not to request origination of a call via the IP-CAN.

Figure 1:
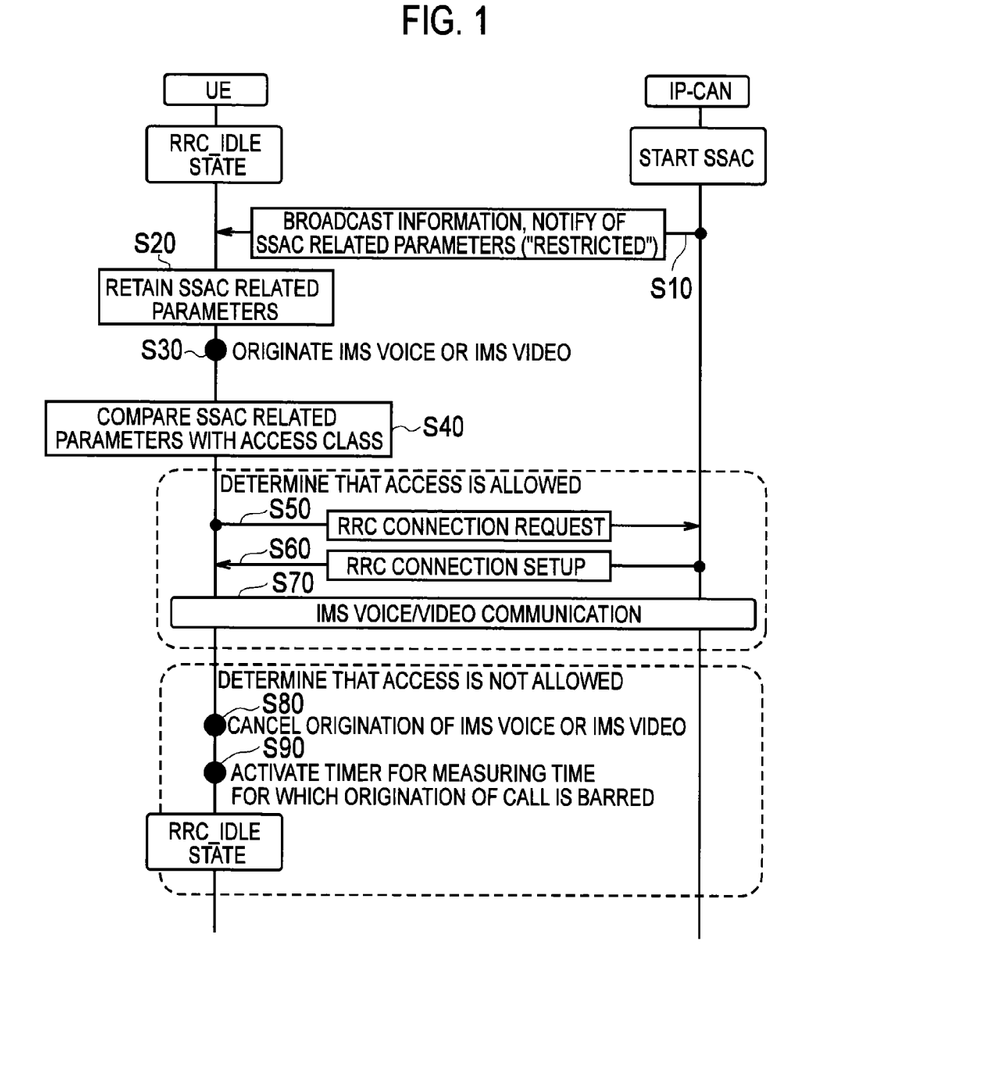
FIG. 1 is a diagram showing a conventional sequence of how SSAC is implemented between a User Equipment (UE) in an RRC IDLE state and an access network (IP-CAN).

FIG. 1 shows a sequence of how SSAC is implemented between a User Equipment (UE) in an RRC IDLE state and an access network (IP-CAN). As shown in FIG. 1, once SSAC is started, the IP-CAN sends broadcast information containing SSAC related parameters to the UE (S10). The broadcast information informs of the start of SSAC and a service to be restricted. The UE retains the SSAC related parameters broadcasted thereto (S20).

Thereafter, based on user's operation or the like, the UE requests to originate voice communication (IMS Voice) or video communication (IMS Video) via the IMS (S30). Specifically, the UE requests the call origination while in the RRC_IDLE state in which connection to the IP-CAN is not established on a radio resource control (RRC) layer. The UE compares the SSAC related parameters retained by the UE with an access class of the UE (e.g., 11 to 15), and determines whether access to the IP-CAN for the call origination is allowed or not (S40). The UE determines whether or not to access the IP-CAN by comparing the parameters notified of through the broadcast information with a random number generated within the UE. If determining that access is allowed, the UE performs processing for originating IMS Voice or IMS Video.

If determining that access is allowed, the UE sends the IP-CAN a RRC Connection Request to request connection to the IP-CAN on the RRC layer (S50). Upon receipt of the RRC Connection Request, the IP-CAN sends the UE an RRC Connection Setup permitting the call origination (S60). After the establishment of RRC Connection, processing for security authentication, Non Access Stratus (NAS) signaling (Service Request), and the like are performed, and the voice communication or video communication via the IMS is started (S70). On the other hand, if determining that access is not allowed, the UE cancels the call-origination request (S80), and activates a timer for measuring a period of time for which origination of INS Voice or IMS Video is barred (S90).

Figure 2:
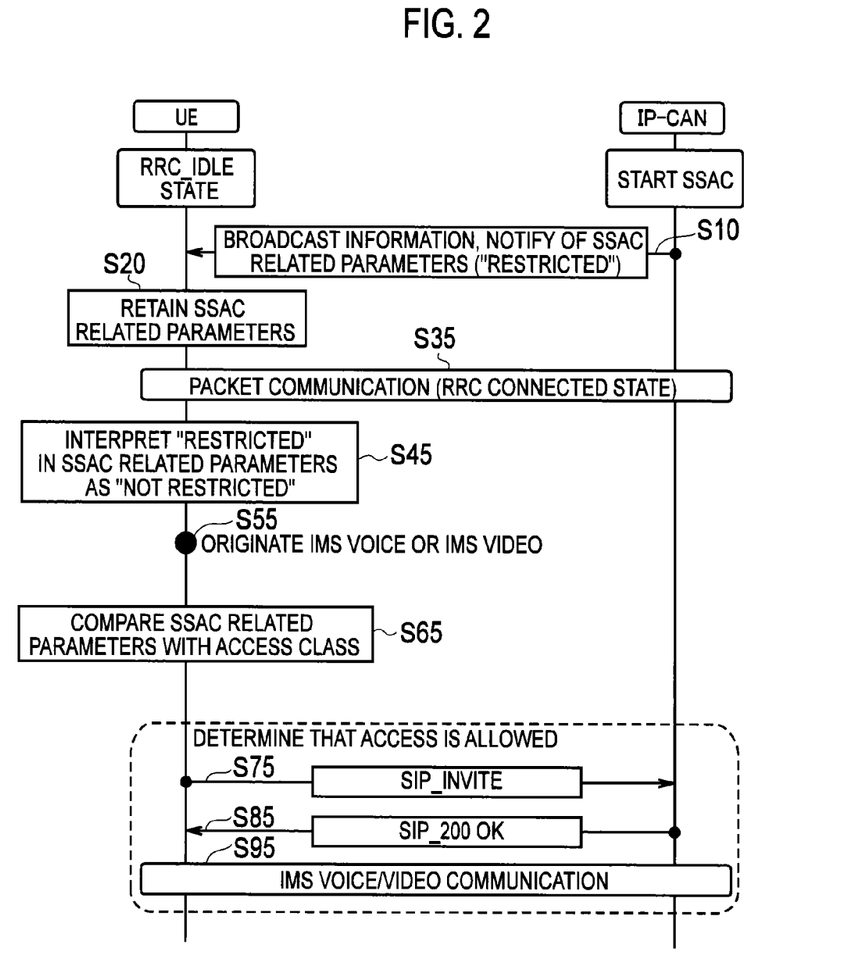
FIG. 2 is a diagram showing a conventional sequence of how SSAC is implemented between a User Equipment (UE) in an RRC CONNECTED state and an access network (IP-CAN).

FIG. 2 shows a sequence of how SSAC is implemented between a User Equipment in an RRC CONNECTED state and an access network. As shown in FIG. 2, after SSAC is started, the UE performs packet communication or the like and transitions to the RRC CONNECTED state (S35). In the RRC CONNECTED state, the UE interprets "restricted" in the SSAC related parameters as "not restricted" (S45). By such operation, the UE in the RRC CONNECTED state is excluded from targets of the access restriction according to SSAC.

Thereafter, in the same manner as the case where the UE is in the RRC IDLE state, the UE requests to originate voice communication (INS Voice) or video communication (INS Video) via the INS based on user's operation, and determines whether access to the IP-CAN for the call origination is allowed or not (S45, S55, S65).

If determining that access is allowed, the UE sends the IP-CAN a call-origination request message (SIP_INVITE) according to Session Initiation Protocol (SIP) (S75). The IP-CAN sends the UE a response (SIP_200 OK) to this message received (S85). As a result, voice communication or video communication via the IMS is started (S95).

PRIOR ART DOCUMENT

Non-Patent Document

Non-patent document 1: 3GPP TS 36.331 V11.0.0 Subclause 5.3.3.10 Handling of SSAC related parameters, 3rd Generation Partnership Project; Technical Specification Group Radio Access Network; Evolved Universal Terrestrial Radio Access (E-UTRA); Radio Resource Control (RRC); Protocol specification (Release 11), 3GPP, June, 2012

Non-patent document 2: 3GPP TS 24.173 V11.2.0 Annex. J, 3rd Generation Partnership Project; Technical Specification Group Core Network and Terminals; IMS multimedia telephony communication service and supplementary services; Stage 3, 3GPP, March 2012

SUMMARY OF THE INVENTION

As described above, 3GPP specifies that even if access restriction according to SSAC is being implemented, a UE in the RRC CONNECTED state interprets the SSAC related parameters as "not restricted by SSAC." For this reason, the access restriction according to SSAC is invalid for UEs in the RRC CONNECTED state. In recent years, smartphones, into which a user can optionally download a myriad of applications to use, has been increasingly widespread. Smartphones are more likely to stay in the RRC CONNECTED state using those applications and the like than conventional mobile stations.

This disables the function of SSAC to achieve access control on a service-by-service basis to avoid congestion of a mobile communication network including an access network, and therefore causes problems of not being able to protect a networking apparatus constituting the mobile communication network from overload or to provide communication which should be prioritized.

The present invention has been made in consideration of such problems, and has an objective of providing a mobile communication, a networking apparatus, and a mobile communication method with which access restriction according to SSAC can be achieved with greater reliability even when the mobile station is in the RRC CONNECTED state.

A first feature of the present invention is a mobile station that restricts transmission of a call-origination request to an access network based on a service-specific access control notified of via the access network, the call-origination request being for provision of a predetermined communication service specified by the service-specific access control, the mobile station including: a restriction information acquisition unit configured to acquire restriction information indicating a content of the service-specific access control; and a call-origination control unit configured to cancel transmission of the call-origination request based on the restriction information acquired by the restriction information acquisition unit if the call-origination request is generated when the mobile station is in a connection-established state in which connection to the access network is established on a radio resource control layer, the transmission being cancelled when the mobile station is in the connection-established state.

A second feature of the present invention is a networking apparatus that transmits a service-specific access control to a mobile station via an access network, the service-specific access control restricting transmission, to the access network, of a call-origination request for provision of a predetermined communication service, the networking apparatus including a restriction information transmission unit configured to transmit restriction information to the mobile station, the restriction information containing an element indicating that the service-specific access control is to be implemented when the mobile station is in a connection-established state in which connection to the access network is established on a radio resource control layer.

A third feature of the present invention is a mobile communication method for restricting transmission of a call-origination request to an access network based on a service-specific access control notified of via the access network, the call-origination request being for provision of a predetermined communication service specified by the service-specific access control, the method including the steps of: acquiring restriction information indicating a content of the service-specific access control; and cancelling transmission of the call-origination request based on the acquired restriction information if the call-origination request is generated in a connection-established state in which connection to the access network is established on a radio resource control layer, the transmission being cancelled in the connection-established state.

MODE FOR CARRYING OUT THE INVENTION

Next, embodiments of the present invention will be described. Note that, in the following description of the drawings, same or similar reference signs denote same or similar elements and portions. In addition, it should be noted that the drawings are schematic ones and dimensional ratios and the like are different from actual ones.

Accordingly, specific dimensions and the like should be determined in consideration of the following description. Moreover, the drawings also include portions having different dimensional relationships and ratios from each other.

(1) Schematic Overall Configuration of the Mobile Communication System

Figure 3:
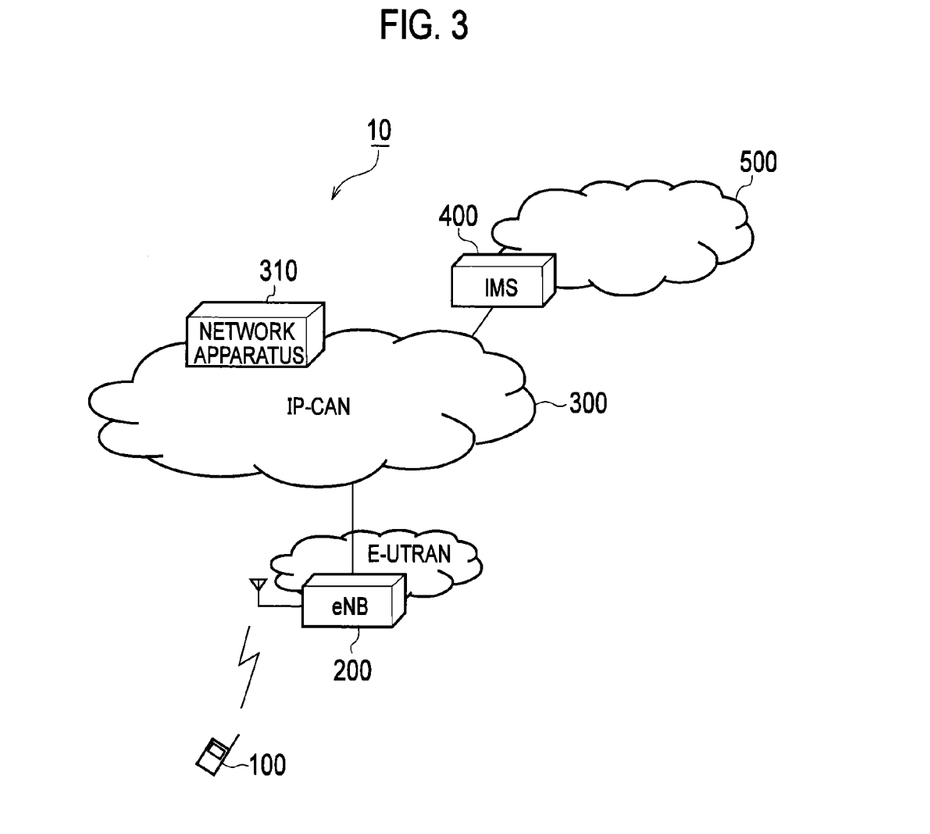
FIG. 3 is a schematic diagram showing the overall configuration of a mobile communication system 10 according to an embodiment of the present invention.

FIG. 3 is a schematic diagram showing the overall configuration of a mobile communication system 10 according to this embodiment. As shown in FIG. 3, the mobile communication system 10 includes a mobile station 100 (called a UE 100 below), a radio base station 200 (called an eNB 200 below), an IP-Connectivity Access Network 300 (called an IP-CAN 300) below), and an IP Multimedia core network Subsystem 400 (called an IMS 400 below).

The UE 100 can perform radio communication with the eNB 200 in conformity with Long Term Evolution (LTE). In this embodiment in particular, based on service-specific access control, namely SSAC, notified of via the IP-CAN 300 (access network), the UE 100 restricts transmission of a call-origination request for provision of a communication service such as a voice or video communication service (a predetermined communication service) defined by the SSAC.

The IP-CAN 300 is an IP access network conforming to the Internet Protocol (IP). Specifically, the IP-CAN 300 is a network providing transport functions for, for example, Session Initiation Protocol (SIP) and voice media. A radio access network (E-UTRAN) configured by the eNB 200 conforming to LTE is connected to the IP-CAN 300.

The IP-CAN 300 is configured with various networking apparatuses 310. Specifically, the IP-CAN 300 is configured with a Mobility Management Entity (MME), a Serving Gateway (SGW), a Packet Data Network Gateway (PGW), a Policy and Charging Rules Function (PCRF), an SGSN (Serving GPRS Support Node), and the like. The networking apparatus 310 can transmit SSAC to the UE 100 via the IP-CAN 300, the SSAC restricting transmission of a call-origination request for provision of voice communication or video communication (a predetermined communication service).

The IMS 400 is a multimedia subsystem conforming to the Internet Protocol. The IMS 400 is configured with a Primary-Call Session Control Function (P-CSCF), an Interrogating-Call Session Control Function (I-CSCF), a Serving-Call Session Control Function (S-CSCF), an Application Server (AS), and the like. An IP network 500 (an external IP network including the Internet and the like) is connected to the IMS 400.

(2) Functional Block Diagram of the Mobile Communication System

Next, the functional block configuration of the mobile communication system 10 is described. Specifically, the functional block configurations of the UE 100 and the networking apparatus 310 are described.

(2.1) UE 100

Figure 4:
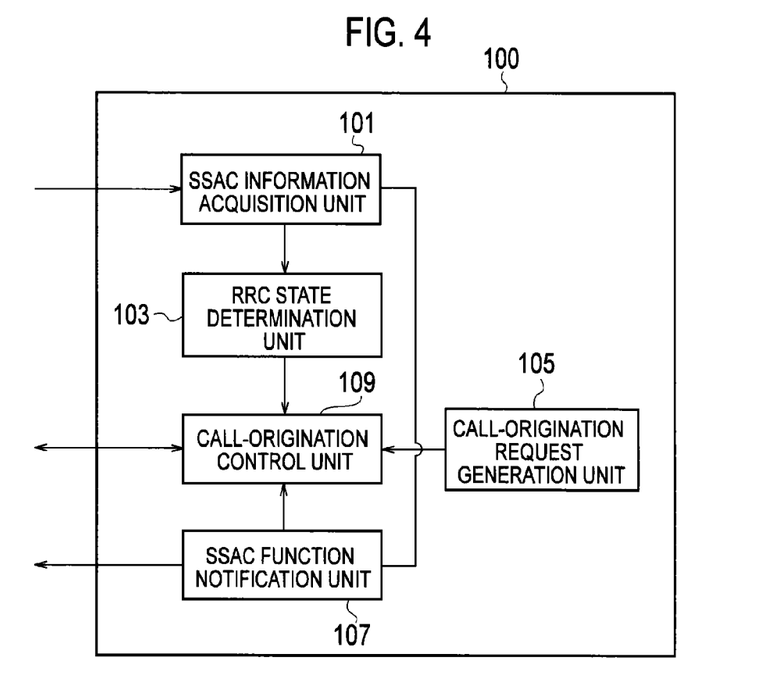
FIG. 4 is a diagram showing the functional block configuration of a UE 100 according to the embodiment of the present invention.

FIG. 4 is a diagram showing the functional block configuration of the UE 100. As shown in FIG. 4, the UE 100 includes an SSAC information acquisition unit 101, an RRC state determination unit 103, a call-origination request generation unit 105, an SSAC function notification unit 107, and a call-origination control unit 109.

The SSAC information acquisition unit 101 acquires restriction information indicating the contents of SSAC contained in broadcast information (SIB) transmitted from the IP-CAN 300 via the eNB 200. In this embodiment, the SSAC information acquisition unit 101 configures a restriction information acquisition unit. Specifically, the SSAC information acquisition unit 101 acquires SSAC related parameters (such as a communication service to be restricted and a restriction rate). The SSAC information acquisition unit 101 can also acquire restriction information containing an element indicating that SSAC is to be implemented when the UE 100 is in an RRC CONNECTED state (a connection established state) in which connection to the IP-CAN 300 is established on a radio resource control layer (RRC layer).

The RRC state determination unit 103 determines the connection state on the RRC layer. Specifically, the RRC state determination unit 103 determines whether the connection state on the RRC layer is the RRC CONNECTED state or an RRC IDLE state in which connection to the IP-CAN 300 is not established on the RRC layer.

The call-origination request generation unit 105 generates a call-origination request to be issued to the IP-CAN 300, based on user's operation on the UE 100 and the like. In this embodiment in particular, the call-origination request generation unit 105 generates a call-origination request for voice communication or video communication.

The SSAC function notification unit 107 notifies the IP-CAN 300 that the UE 100 has an SSAC function. Specifically, the SSAC function notification unit 107 notifies the networking apparatus 310 constituting the IP-CAN 300 of a functional capacity indication indicating that the UE 100 has a function of implementing SSAC in the RRC CONNECTED state.

The call-origination control unit 109 controls origination of a call to the IP-CAN 300 based on the call-origination request generated by the call-origination request generation unit 105. Specifically, when the call-origination request generation unit 105 generates a call-origination request, or specifically a call-origination request for voice communication or video communication, with the RRC state determination unit 103 having determined that the connection state on the RRC layer is the RRC CONNECTED state, the call-origination control unit 109 cancels transmission of the call-origination request based on the SSAC restriction information acquired by the SSAC information acquisition unit 101, although it is specified that SSAC is not to be implemented when the UE 100 is in the RRC CONNECTED state.

In other words, although it is specified as standard operation that SSAC is not to be implemented when the UE 100 is in the RRC CONNECTED state, the call-origination control unit 109 executes call-origination restriction (access restriction) conforming to SSAC if a call-origination request for voice communication or video communication (a predetermined communication service) is generated.

The call-origination control unit 109 can also determine whether or not to cancel transmission of the call-origination request based on an element indicating that SSAC is to be implemented when the UE 100 is in the RRC CONNECTED state.

In transmitting the call-origination request, the call-origination control unit 109 sends the IP-CAN 300 a call-origination request message (SIP_INVITE) conforming to SIP, based on the access class (e.g., 11 to 15) of the UE 100 retained by the UE 100.

(2.2) Networking Apparatus 310

Figure 5:
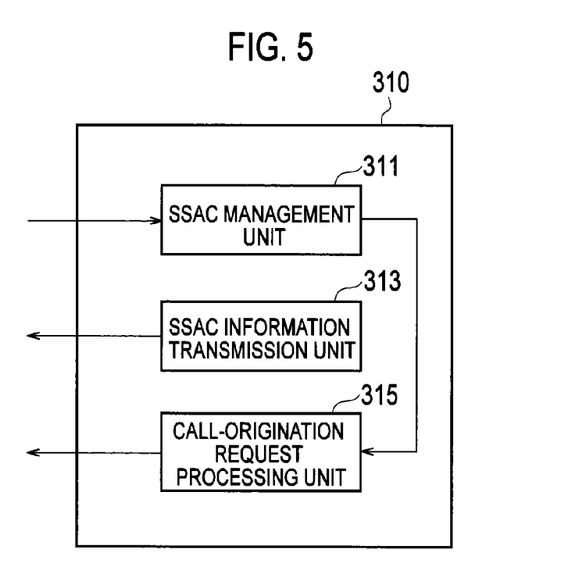
FIG. 5 is a diagram showing the functional block configuration of a networking apparatus 310 according to the embodiment of the present invention.

FIG. 5 is a diagram showing the functional block configuration of the networking apparatus 310. As shown in FIG. 5, the networking apparatus 310 includes an SSAC management unit 311, an SSAC information transmission unit 313, and a call-origination request processing unit 315.

The SSAC management unit 311 manages an SSAC related function of the UE 100. Specifically, the SSAC management unit 311 acquires, via the IP-CAN 300, a functional capacity indication indicating that the UE 100 has a function of implementing SSAC when in the RRC CONNECTED state. In this embodiment, the SSAC management unit 311 configures a restriction management unit.

The SSAC information transmission unit 313 sends the UE 100 restriction information containing an element indicating that SSAC is to be implemented when the UE 100 is in the RRC CONNECTED state. In this embodiment, the SSAC information transmission unit 313 configures a restriction information transmission unit. Specifically, by using broadcast information (SIB) broadcasted to the UE 100, the SSAC information transmission unit 313 sends the UE 100 the restriction information containing the SSAC related parameters and the aforementioned element.

The call-origination request processing unit 315 processes SIP_INVITE (a call-origination request) sent from the UE 100. In this embodiment in particular, the call-origination request processing unit 315 can determine the priority level for SIP_INVITE, when the SIP_INVITE is received from the UE 100, based on the functional capacity indication acquired by the SSAC management unit 311, i.e., whether or not the UE 100 has the function of implementing SSAC when in the RRC CONNECTED state, so that SIP_INVITE from a UE having a function of implementing SSAC when in the RRC CONNECTED state is processed in prior to SIP_INVITE from a UE not having the function.

The call-origination request processing unit 315 also sends a response message (SIP_200 OK) to the UE 100 when accepting the SIP_INVITE.

(3) Operation of the Mobile Communication System

Figure 6:
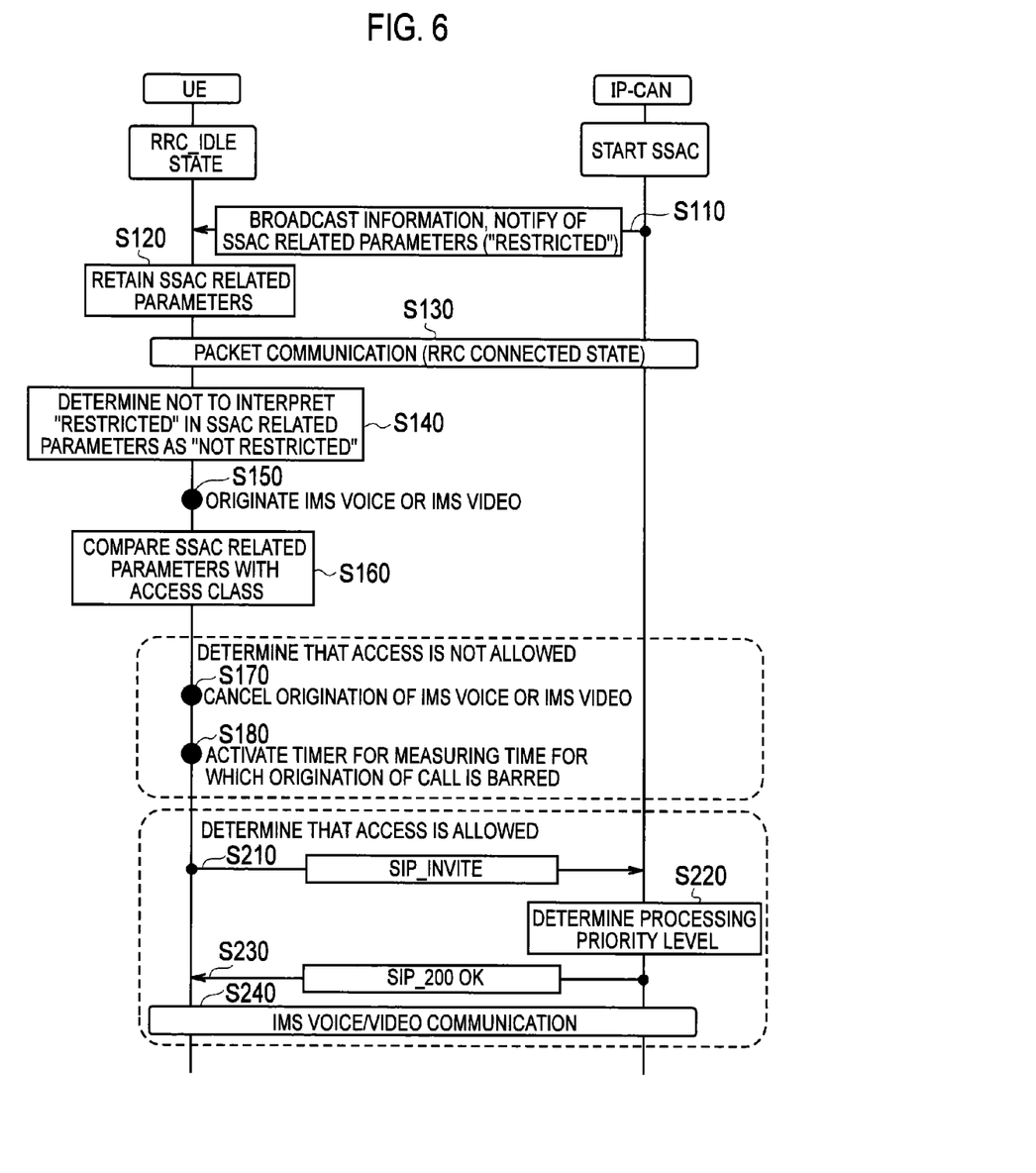
FIG. 6 is a diagram showing a communication sequence performed when the UE 100 in the RRC CONNECTED state implements SSAC according to the embodiment of the present invention.
Figure 7:
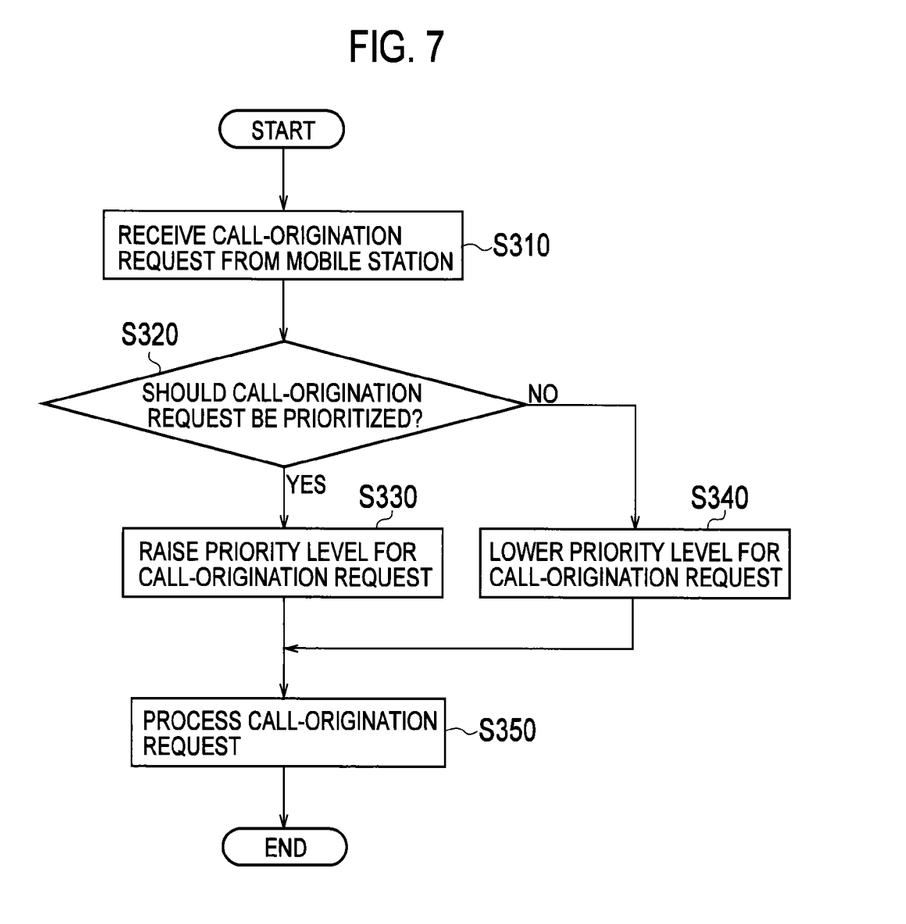
FIG. 7 is a diagram showing a flow of the networking apparatus 310 processing a call-origination request message (SIP_INVITE) according to the embodiment of the present invention.

Next, operation of the mobile communication system 10 described above is described. Specifically, descriptions are given of a communication sequence performed when the UE 100 in the RRC CONNECTED state implements SSAC, and a flow of how the networking apparatus 310 processes a call-origination request message (SIP_INVITE).

(3.1) Implementation of SSAC by the UE 100

FIG. 6 shows a communication sequence performed when the UE 100 in the RRC CONNECTED state implements SSAC. As shown in FIG. 6, once SSAC is started, the IP-CAN 300 sends the UE 100 broadcast information containing SSAC related parameters (S110). Through this broadcast information, the UE 100 is notified of the start of SSAC and a service to be restricted, or specifically voice communication or video communication. The UE 100 retains the SSAC related parameters thus broadcasted thereto (S120).

Next, the UE 100 performs packet communication or the like after the start of SSAC, and transitions from the RRC IDLE state to the RRC CONNECTED state (S130). Note that the processing in Steps S110 to S130 are the same as Steps S10, S20, and S35 shown in FIG. 2.

Since the UE 100 is now in the RRC CONNECTED state, in the standard operation, the UE 100 interprets "restricted" in the SSAC related parameters (see 3GPP TS36.311 Sub-clause 5.3.3.10) as "not restricted." However, the UE 100 determines not to interpret "restricted" as "not restricted" (S140). Next, the UE 100 requests to originate voice communication (IMS Voice) or video communication (IMS Video) via the IMS 400, based on user's operation or the like (S150).

The UE 100 compares the SSAC related parameters with the access class of the UE 100 retained by the UE 100, and thereby determines whether access to the IP-CAN 300 for the call origination is allowed or not (S160). Specifically, although it is specified as standard operation that SSAC is not to be implemented when the UE 100 is in the RRC CONNECTED state, the UE 100 executes call-origination restriction (access restriction) conforming to SSAC if the call-origination request is generated for voice communication or video communication (a predetermined communication service). As is similar to the communication sequences shown in FIGS. 1 and 2, the UE 100 determines whether access to the IP-CAN 300 is allowed or not by comparing the parameters notified of through broadcast information with a random number generated within the UE 100. Then, if determining that access is allowed, the UE 100 executes call-origination processing for the INS Voice or IMS Video.

If determining that access is not allowed, the UE cancels the call-origination request (S170), and activates a timer for measuring the period of time for which origination of IMS Voice or IMS Video is barred (S180). If determining that access is allowed, the UE 100 sends a call-origination message (SIP_ INVITE) conforming to SIP to the IP-CAN 300 (S210).

Upon receipt of the SIP_INVITE, the networking apparatus 310 determines the processing priority level for the received SIP_ INVITE based on, for example, whether the UE 100 has a function of implementing SSAC when in the RRC CONNECTED state or not (S220). Specifically, the networking apparatus 310 processes SIP_ INVITE from a UE having the aforementioned function in prior to SIP_IN-VITE from a UE not having the aforementioned function.

The networking apparatus 310 sends the UE 100 SIP 200 OK which is a response to the SIP_INVITE received (S230). As a result, voice communication or video communication via IMS is started (S240).

(3.2) Processing on a Call-Origination Request Message (SIP_INVITE) in Networking Apparatus 310

FIG. 7 shows a flow of how the networking apparatus 310 processes a call-origination message (SIP_INVITE). Specifically, FIG. 7 shows details of the processing in Step S220 shown in FIG. 6. As shown in FIG. 7, the networking apparatus 310 receives a call-origination request, or namely, SIP_INVITE from the UE 100 (S310).

The networking apparatus 310 determines whether or not to prioritize processing on the SIP_INVITE (S320). For example, as described above, the networking apparatus 310 can determine the priority level for processing the received SIP_INVITE based on whether the UE 100 has a function of implementing SSAC when in the RRC CONNECTED state or not. It should be noted, however, that the priority level does not necessarily have to be determined based on whether the UE 100 has the aforementioned function or not.

If the UE 100 has the aforementioned function, the networking apparatus 310 raises the priority level for processing the received SIP_INVITE (S330). If the UE 100 does not have the aforementioned function, the networking apparatus 310 lowers the priority level for processing the received SIP_INVITE (S340).

The networking apparatus 310 processes the received SIP_ INVITE (call-origination request) in accordance with the processing priority level thus determined (S350).

(4) Advantageous Effects

According to the mobile communication system 10, if a call-origination request for voice communication or video communication is generated when the UE 100 is in the RRC CONNECTED state, the UE 100 cancels transmission of the call-origination request based on restriction information in SSAC acquired, although it is specified that SSAC is not to be implemented when the UE 100 is in the RRC CONNECTED state. Thus, SSAC can be effectively enforced for a specific communication service (voice communication or video communication) even when the UE 100 is in the RRC CONNECTED state, so that the call-origination request for provision of the communication service is restricted.

Hence, according to the mobile communication system 10, even in a case where there are many UEs such as smartphones which often stay in the RRC CONNECTED state, the networking apparatus 310 or other networking apparatus constituting the IP-CAN 300 can be protected from overload, and also, communication which should be prioritized can be provided.

In this embodiment, the networking apparatus 310 can notify the UE 100 of restriction information containing an element indicating that SSAC is to be implemented when the UE 100 is in the RRC CONNECTED state. For this reason, determination on whether or not to implement SSAC when the UE 100 is in the RRC CONNECTED state can be made flexibly at the network initiative according to the congestion status of the IP-CAN 300 or the like.

In this embodiment, the LTE 100 can notify the networking apparatus 310 of the functional capacity indication indicating that the LTE 100 has a function of implementing SSAC when in the RRC CONNECTED state. For this reason, the networking apparatus 310 can, for example, preferentially process SIP_INVITE from the LTE 100 having the aforementioned function. Thus, precise priority control can be performed according to the type of the UE 100 or the like.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, in the above embodiment of the present invention, SIP_INVITE (a call-origination request) from a LTE having a function of implementing SSAC when in the RRC CONNECTED state is processed in prior to SIP_IN-VITE from a LTE not having such a function. However, the UE 100 does not necessarily have to have such a function. In addition, although the networking apparatus 310 can notify the UE 100 of restriction information containing an element indicating that SSAC is implemented when the UE 100 is in the RRC CONNECTED state in the above embodiment, such a function is not essential, either.

Although voice communication and video communication are used as examples of the predetermined communication service in the above embodiment, the present invention is not limited to these communication services, and may be applied to other communication services, as well.

As described above, the present invention includes various embodiments which are not described herein, of course. Accordingly, the technical scope of the present invention should be determined only by the matters to define the invention in the scope of claims regarded as appropriate based on the disclosure.

The present invention may be expressed as follows. A first feature of the present invention is summarized as a radio base station eNB including: UE 100 (a mobile station) that restricts transmission of SIP_INVITE (a call-origination request) to an access network based on SSAC (a service-specific access control) notified of via IP-CAN 300 (the access network), the call-origination request being for provision of voice communication or video communication (a predetermined communication service) specified by the service-specific access control, the mobile station including: SSAC information acquisition unit 101 (a restriction information acquisition unit) configured to acquire restriction information indicating a content of the service-specific access control; and call-origination control unit 109 (a call-origination control unit) configured to cancel transmission of the call-origination request based on the restriction information acquired by the restriction information acquisition unit if the call-origination request is generated when the mobile station is in RRC CONNECTED state (a connection-established state) in which connection to the access network is established on a radio resource control layer, the transmission being cancelled when the mobile station is in the connection-established state.

In the first feature of the present invention, the restriction information acquisition unit may acquire the restriction information containing an element indicating that the service-specific access control is to be implemented when the mobile station is in the connection-established state, and the call-origination control unit may determine whether or not to cancel transmission of the call-origination request based on the element.

In the first feature of the present invention, the mobile station may include SSAC function notification unit 107 (a function notification unit) configured to notify a networking apparatus constituting the access network of a functional capacity indication indicating that the mobile station has a function of implementing the service-specific access control when in the connection-established state.

A second feature of the present invention is summarized as networking apparatus 310 (a networking apparatus) that transmits a service-specific access control to a mobile station via an access network, the service-specific access control restricting transmission, to the access network, of a call-origination request for provision of a predetermined communication service, the networking apparatus including SSAC info (a restriction information transmission unit) configured to transmit restriction information to the mobile station, the restriction information containing an element indicating that the service-specific access control is to be implemented when the mobile station is in a connection-established state in which connection to the access network is established on a radio resource control layer.

In the second feature of the present invention, the networking apparatus includes SSAC management unit 311 (a restriction management unit) configured to acquire a functional capacity indication via the access network, the functional capacity indication indicating that the mobile station has a function of implementing the service-specific access control when in the connection-established state; and call-origination request processing unit 315 (a call-origination request processing unit) configured to determine a priority level for processing the call-origination request, when the request is received from the mobile station, based on the functional capacity indication acquired by the restriction management unit so that a call-origination request from a mobile station having the function of implementing the service-specific access control when in the connection-established state is processed in prior to a call-origination request from a mobile station not having the function.

A third feature of the present invention is summarized as a mobile communication method for restricting transmission of a call-origination request to an access network based on a service-specific access control notified of via the access network, the call-origination request being for provision of a predetermined communication service specified by the service-specific access control, the method including the steps of: acquiring restriction information indicating a content of the service-specific access control; and cancelling transmission of the call-origination request based on the acquired restriction information if the call-origination request is generated in a connection-established state in which connection to the access network is established on a radio resource control layer, the transmission being cancelled in the connection-established state.

Note that the entire content of Japanese Patent Application No. 2012-173047 (filed on Aug. 3, 2012) is incorporated by reference in the present specification.

INDUSTRIAL APPLICABILITY

According to the aspects of the present invention, a mobile station, a networking apparatus, and a mobile communication method with which access restriction according to SSAC can be achieved with greater reliability even when the mobile station is in an RRC CONNECTED state can be provided.

EXPLANATION OF THE REFERENCE NUMERALS

10 mobile communication system
100 UE
101 SSAC information acquisition unit
103 RRC state determination unit
105 call-origination request generation unit
107 SSAC function notification unit
109 call-origination control unit
200 eNB
300 IP-CAN
310 networking apparatus
311 SSAC management unit
313 SSAC information transmission unit
315 call-origination request processing unit
400 IMS
500 IP network

The invention claimed is:

1. A mobile station that restricts transmission of a call-origination request to an access network based on a service-specific access control notified of via the access network, the call-origination request being for provision of a predetermined communication service specified by the service-specific access control, the mobile station comprising:
a communication interface configured to acquire restriction information indicating a content of the service-specific access control; and
circuitry configured to cancel transmission of the call-origination request based on the restriction information acquired by the communication interface if the call-origination request is generated when the mobile station is in a connection-established state in which connection to the access network is established on a radio resource control layer, the transmission being cancelled when the mobile station is in the connection-established state.

2. The mobile station according to claim 1, wherein
the communication interface acquires the restriction information containing an element indicating that the service-specific access control is to be implemented when the mobile station is in the connection-established state, and
the circuitry determines whether or not to cancel transmission of the call-origination request based on the element.

3. The mobile station according to claim 1, wherein
the communication interface is configured to notify a networking apparatus constituting the access network of a functional capacity indication indicating that the mobile station has a function of implementing the service-specific access control when in the connection-established state.

4. A networking apparatus that transmits a service-specific access control to a mobile station via an access network, the service-specific access control restricting transmission, to the access network, of a call-origination request for provision of a predetermined communication service, the networking apparatus comprising:
a communication interface configured to transmit restriction information to the mobile station, the restriction information containing an element indicating that the service-specific access control is to be implemented when the mobile station is in a connection-established state in which connection to the access network is established on a radio resource control layer.

5. The networking apparatus according to claim 4, wherein
the communication interface is configured to acquire a functional capacity indication via the access network, the functional capacity indication indicating that the mobile station has a function of implementing the service-specific access control when in the connection-established state; and
the networking apparatus further comprises circuitry configured to determine a priority level for processing the call-origination request, when the request is received from the mobile station, based on the functional capacity indication acquired by the communication interface so that a call-origination request from a mobile station having the function of implementing the service-specific access control when in the connection-established state is processed in prior to a call-origination request from a mobile station not having the function.

6. A mobile communication method for restricting transmission of a call-origination request to an access network based on a service-specific access control notified of via the access network, the call-origination request being for provision of a predetermined communication service specified by the service-specific access control, the method comprising the steps of:
acquiring restriction information indicating a content of the service-specific access control; and
cancelling transmission of the call-origination request based on the acquired restriction information if the call-origination request is generated in a connection-established state in which connection to the access network is established on a radio resource control layer, the transmission being cancelled in the connection-established state.

* * * * *